Jan. 29, 1929.
T. DUGAN
1,700,158
HARVESTER THRASHER
Filed Aug. 12, 1925
2 Sheets-Sheet 1
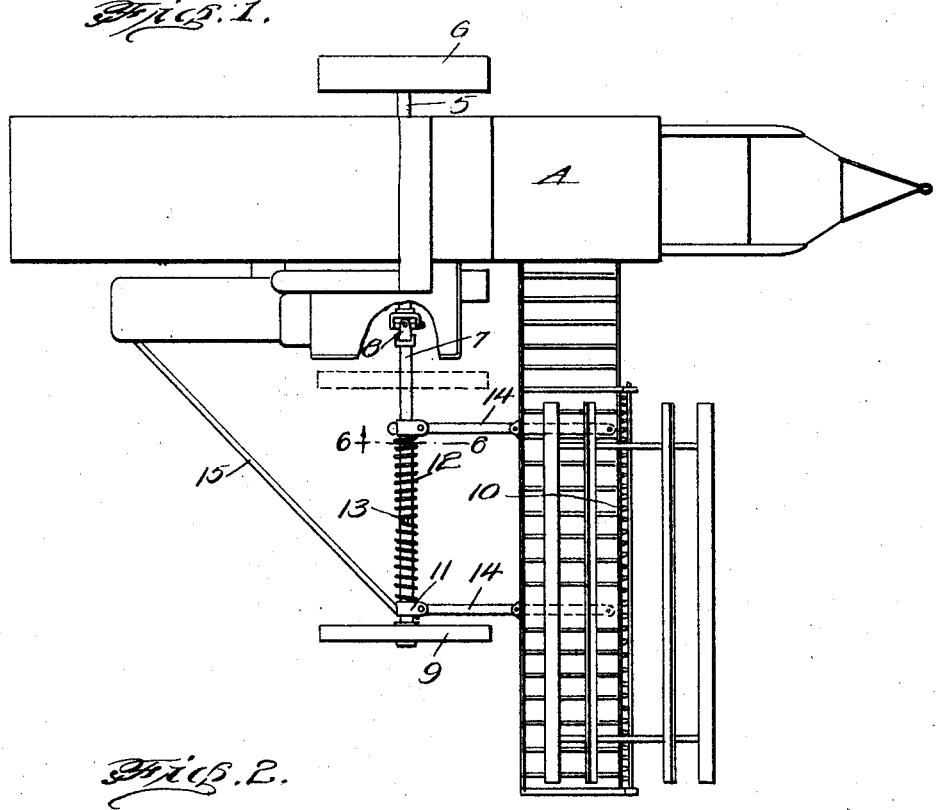
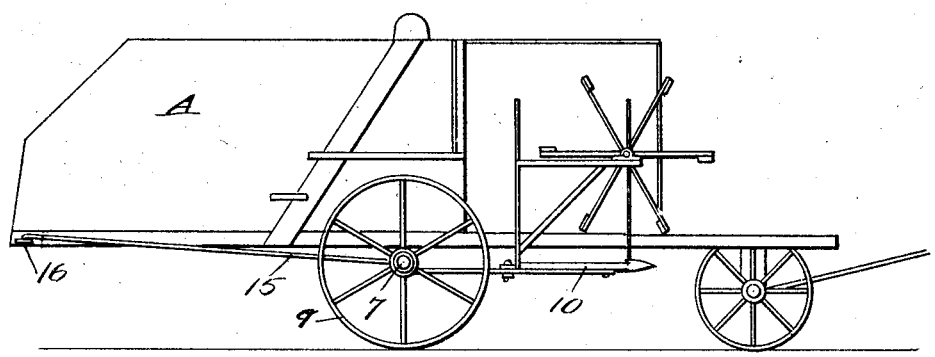
Inventor
Thomas Dugan.
By Clarence A. O'Brien
Attorney

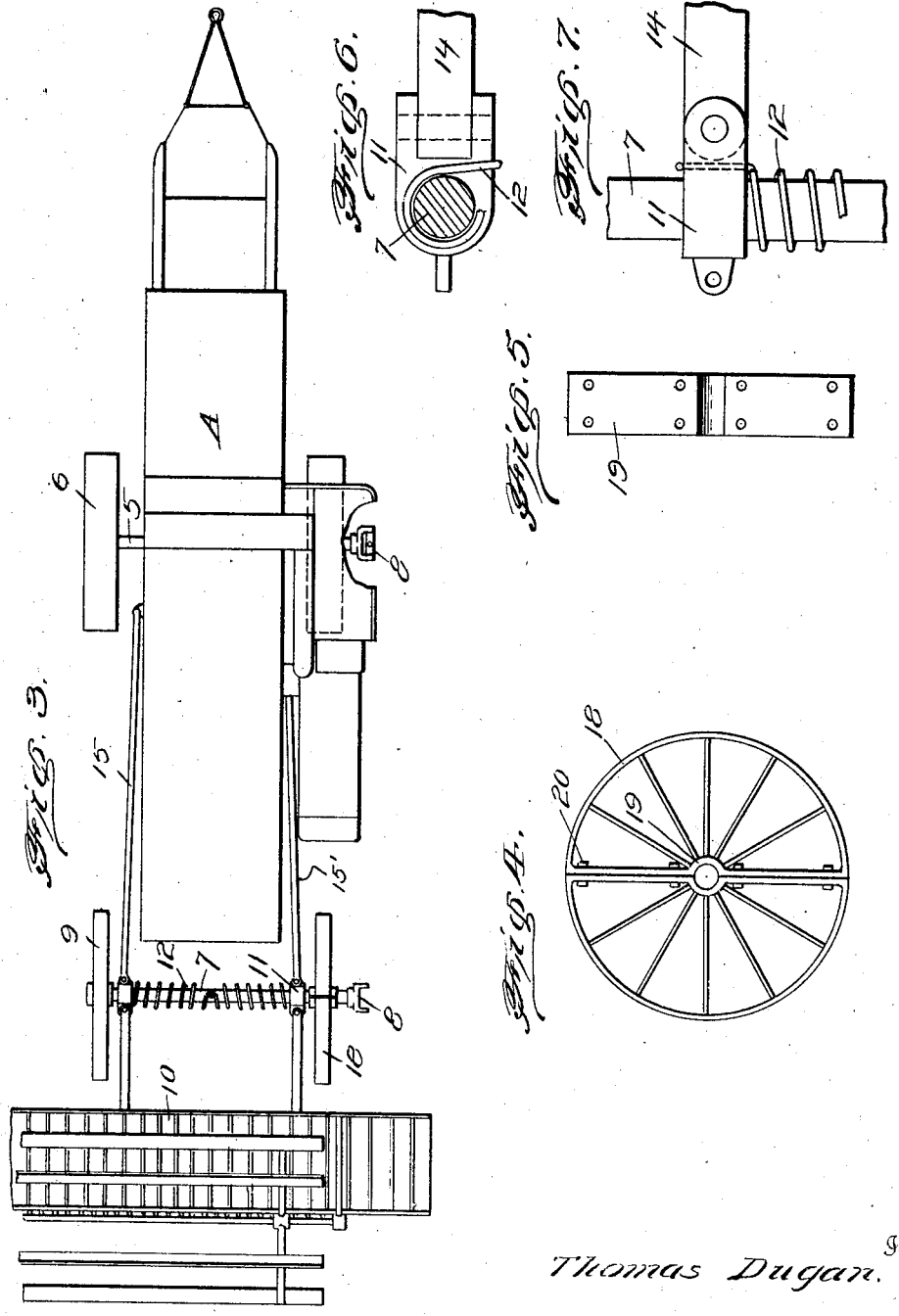

Patented Jan. 29, 1929.

1,700,158

UNITED STATES PATENT OFFICE.

THOMAS DUGAN, OF WICHITA, KANSAS.

HARVESTER THRASHER.

Application filed August 12, 1925. Serial No. 49,776.

The present invention relates to a harvester thrasher and has for its principal object to provide a thrasher of this nature wherein it is possible to move the cutting bar and associated parts of the harvester thrasher to a position so that the harvester thrasher may be taken along the road without using too much room, and may be moved over narrow bridges, and through narrow gateways and the like.

A specific object of the invention is to provide a harvester thrasher wherein the cutter bar and associated mechanism is detachable and upon which may be mounted a split wheel so that the cutter bar and associated mechanism are mounted on an individual truck which may be hauled behind the harvester and thrasher.

A further very important object of the invention is to provide a harvester thrasher of this nature which is simple in its construction, strong, durable, easy to manipulate, reliable and efficient in its use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing

Figure 1 is a top plan view of a harvester thrasher embodying the features of my invention, Fig. 2 is a side elevation thereof, Fig. 3 is a top plan view of the harvester and thrasher showing the cutter bar and associated mechanism mounted on the rear, and Fig. 4 is an elevation of the split wheel, Fig. 5 is an edge elevation of one-half of the split wheel, Fig. 6 is a section taken on line 6—6 of Figure 1 through the axle of the truck showing in elevation and associated mechanism, and Fig. 7 is a detail plan view of the mechanism shown in Fig. 6.

Referring to the drawing in detail, it will be seen that A designates diagrammatically a harvester thrasher of any desired type mounted on the axle 5 which has journaled thereon the wheels 6. An auxiliary axle 7 is attached to one end of the axle 5 by a universal coupling 8 and journaled thereon is the wheel 9. On this auxiliary axle 7 are mounted the parts usually termed the cutter bar mechanism and indicated by the numeral 10. To mount this mechanism 10, I provide collars 11 on the axle which are held in predetermined positions by a spring 12, the intermediate portion of which is engaged with a pin or lug 13 on the axle 7. Arms 14 connect the mechanism 10 to the collars 11. To one of the collars 11 there is attached the brace rod 15 which is engageable with the harvester thrasher as at 16.

As is well known, the width of a harvester thrasher with a cutting bar mechanism to the side thereof is such as to be very inconvenient in moving the harvester thrasher from place to place particularly over roadways, bridges, and through gates. I contemplate removing the cutter bar mechanism by mounting the same to the rear of the harvester thrasher as shown in Fig. 3 when the harvester thrasher is travelling from place to place and not in actual use.

I first apply to the axle 7 a split wheel indicated generally at 18 and consisting of half sections 19 which may be bolted together as is indicated at 20. After the split wheel has been applied to the axle 7 as is disclosed in dotted lines in Fig. 1, a pin of the coupling 8 may be removed and the brace 15 disengaged from the harvester thrasher at 16.

The cutter bar and associated mechanism may then be hauled around to the rear of the harvester thrasher and attached thereto by means of the brace bar 15 and another similar bar 15'. When thus disposed it will be seen that the harvester thrasher may be drawn along the roadway taking up practically no more room than an ordinary vehicle.

It is thought that the construction, operation, and advantages of my invention will now be clearly understood without a more detailed description thereof. The present embodiment of the invention has been disclosed merely by way of example, since in actual practice it attains the features of advantage enumerated as desirable in the statement of the invention and the above description.

It will be apparent that numerous changes in the details of construction in the combination and in the arrangement of parts will be resorted to without departing from the spirit or scope of the invention as hereinafter claimed or sacrificing any of its advantages.

Having thus described my invention, what I claim as new is:

In a harvester thrasher, a body, an axle shaft rotatable in the body, a wheel on the axle shaft, a coupling element on the shaft, a cutter bar mechanism including an axle shaft, a wheel on the second axle shaft, a coupling element on the second axle shaft, means for connecting the coupling elements, and a split wheel detachably engageable with the second shaft.

In testimony whereof I affix my signature.

THOMAS DUGAN.